C. F. Hall.
Machine for Re-fitting conical Valve.

No. 72031

PATENTED DEC 10 1867

Witnesses.

Inventor.
C. F. Hall

United States Patent Office.

CHARLES F. HALL, OF BROOKLYN, NEW YORK.

*Letters Patent No. 72,031, dated December 10, 1867.*

IMPROVED MACHINE FOR REFITTING CONICAL VALVES.

The Schedule referred to in these Letters Patent and making part of the same.

TO ALL WHOM IT MAY CONCERN:

Be it known that I, CHARLES F. HALL, of Brooklyn, in the county of Kings, and State of New York, have invented a new and useful Improvement in Machine for Refitting Conical Valves; and I do hereby declare that the following is a full, clear, and exact description thereof, which will enable those skilled in the art to make and use the same, reference being had to the accompanying drawings, forming part of this specification.

This invention relates to a device by which the conical stop-valves of gas, steam, and water-works may be refitted or repaired when from any cause they are rendered leaky and unfit for use; and the invention consists in providing a milling-tool of such a form that valves may thereby be rendered true and fit for service, as will be herein more fully described.

Similar letters of reference indicate corresponding parts.

Figure 1:
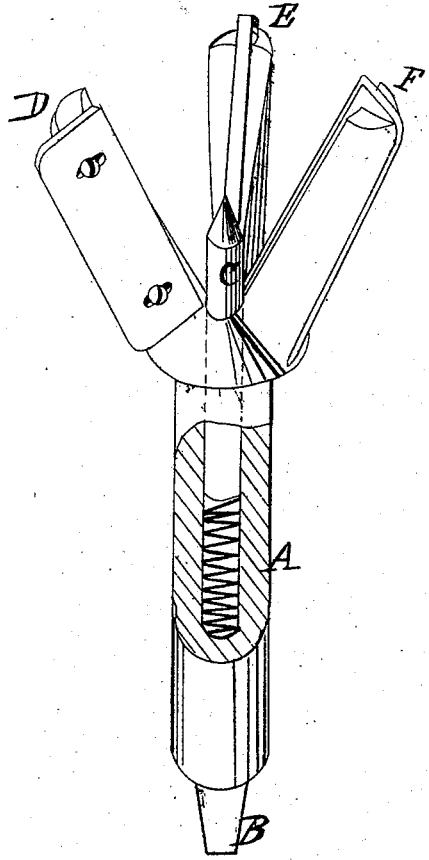
Figure 1 represents a longitudinal view of the tool, partly in section.
Figure 2:
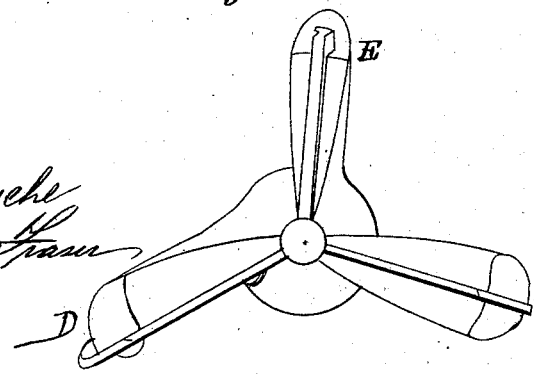
Figure 2 is a top or end view of the same.

As the tools for the purpose intended have hitherto been made, the cutting-edges have been formed on the interior surface of a hollow cone, the surface of the interior or disk of the cone being serrated and forming cutting-edges, which radiate from near a common centre and at an angle to a central line which shall correspond with the bevel or angle of ordinary stop or conical valves and seats, so that valves of all the common sizes, from a small to a large diameter, may be operated upon by the same tool.

As regards the angles and position of the cutting-edges with regard to the centre, the tool which I provide does not differ from the above, but instead of the continuous cup or hollow cone, I provide for one or more adjustable and removable cutters on arms or longitudinal sections of a cone which stand at the desired angle with regard to the central line, as shown in the drawing. These cutters may be attached to the arms in any convenient and suitable manner.

In this example, of my invention three methods are represented, corresponding in number with the arms on the shaft.

A represents the shaft. B is the square shank by which the tool is revolved. C represents the centre, which is placed in the shaft on a spiral spring, so that it will yield and adjust itself to the work it has to do, as, for instance, to valves of the different sizes or diameters which it may be necessary to operate upon. D, E, and F represent the arms to which the removable and adjustable cutters are attached. In D the cutter is secured by screws with slotted holes in the cutter. In E the cutter is dove-tailed into the arm, and in F it is secured in a slot in the arm, as seen in the drawing.

I do not confine myself to any particular number of arms or cutters, nor to any particular method of securing or attaching the cutters to the arms; nor do I confine myself to any particular-shaped cutter or cutting-edge, for I am aware that the desired effect may be produced on a conical valve should the cutter or cutters stand in an inclined or in a spiral position, or an oblique longitudinal section of a cone with curved cutting-edge or edges; neither do I confine myself to removable or adjustable cutters or cutting-edges; but What I do claim, and desire to secure by Letters Patent, is—

1. A milling-tool, with one or more cutters attached to one or more arms or longitudinal sections of a cone, (whether straight or oblique,) whereby conical valves of different sizes may be refitted, constructed substantially as shown and described.

2. In combination therewith, I claim the yielding centre C, substantially as described.

The above specification of my invention signed by me, this 5th day of September, 1867.

CHARLES F. HALL.

Witnesses:
WM. F. McNAMARA,
ALEX. F. ROBERTS.